United States Patent Office 2,882,252
Patented Apr. 14, 1959

2,882,252

PASTE POINTING SYNTHETIC RESINOUS COMPOSITION

John E. Stefanik, New Kensington, Pa., assignor to Pittsburgh Plate Glass Company, Allegheny County, Pa., a corporation of Pennsylvania No Drawing. Application April 25, 1955
Serial No. 503,836

6 Claims. (Cl. 260—27)

This invention relates to colored pointing compounds comprising stable homogeneous dispersions of a pigment in an aqueous emulsion of a polyvinyl resin which compounds are useful in sealing the joints between glass, ceramic, plastic or enameled metal tile, sheets or panels and to the method of preparing such compounds.

In recent years extensive use has been made of colored glass panels or tile in building construction. Architects and decorators, in specifying such materials, have utilized pointing compounds having colors that either match or contrast with the color of the glass. These glass sheets, panels or tile are commonly used in locations where they are exposed to water, moisture vapor and wide variations in temperature; such as, for example, in baths and kitchens. In addition to being subjected to shock caused by temperature changes, these glass members are also exposed to impacts and pressures during cleaning. It is essential, therefore, to provide a pointing compound which adheres well to glass and remains elastic for long periods of time in order to provide a cushioning effect between the edges of adjacent glass members. These compounds must also provide an effective barrier against water, moisture vapor and other vapors capable of affecting the subsurface structure to which the glass members are secured; such as, for example, the adhesives or cements employed to secure the glass members to the subsurface structure. Also, it is essential that these compounds maintain their color values over long periods of time without having the color run thus causing streaks, blotches or decolored areas, even though exposed to water and moisture vapor.

The installation of sheets or panels and tile formed of glass, ceramic, plastic or metallic materials ordinarily involves the application of an adhesive or a quick-setting cement to a prepared subsurface, following which, these members are pressed into the adhesive or cement. A uniform spacing is maintained between the side edges of the panels or the like which, after the adhesive or cement has become set, are filled with the pointing compound. The preferred consistency of such compounds for the application thereof between the panels is a slightly fluid paste-like consistency. These compounds are ordinarily marketed in collapsible metal tubes from which they may be dispensed in the usual manner. It is essential, therefore, not only to provide pointing compounds having the proper consistency but, as well for the maintenance of this consistency without loss of homogeneity over long periods of time.

The pointing compounds heretofore available have not possessed all of the essential properties of materials of this type described hereinabove. It is, therefore, the principal object of this invention to provide a pigmented pointing compound having a fluid, paste-like consistency; and, in which compound, the pigment remains homogeneously dispersed for long periods of time. It is also an object of this invention to provide a method for producing a stable homogeneous dispersion of a pigment in a fluid, paste-like composition comprising, essentially, an aqueous emulsion of a polyvinyl resin. Another object of this invention is to provide a stable pigmented pointing composition which, in use, remains elastic for long periods of time even though exposed to water and moisture vapor and subjected to frequent and large changes in temperature. Still another object of this invention is to provide a pigmented pointing compound which, in use, remains uniformly colored when exposed to water and moisture vapor. A further object of this invention is to provide a pigmented pointing composition which has excellent adherence to glass and ceramic surfaces and which provides an effective barrier to water and moisture vapor or other contaminants capable of causing deterioration of the subsurface structure to which the glass or ceramic member is secured. A still further object of this invention is to provide a pigmented pointing composition for use in the spaces between sheets, panels or tiles of glass, plastic or ceramic materials which effectively cushions such members when they are subjected to temperature and impact shocks.

The foregoing and other objects of this invention are accomplished by preparing a base composition comprising a high solids-content aqueous emulsion of a high viscosity polyvinyl resin, a plasticizing and extending modified polystyrene resin or a plasticizer and mixtures thereof. To this base there is added an inorganic pigment having water-absorbing properties or a mixture thereof with a water absorbent inorganic extender or filler. Stabilizing and emulsifying agents commonly employed in the art may also be employed, if desired.

The essential component of the base employed in the pointing compounds of this invention is low viscosity aqueous emulsion of a high viscosity, film-forming polyvinyl resin. Among the polyvinyl resins which are useful in this invention are polyvinyl acetate, copolymers of vinyl acetate and acrylic resins, and vinylidene resins. It is preferred, however, to employ a high solids content aqueous emulsion of a high viscosity polyvinyl acetate resin. The aqueous emulsions of polyvinyl acetate resin sold under the trade-name "Elvacet 81–900" are typical of the resin emulsions which may be employed in the pointing compositions comprising this invention. The polyvinyl acetate resin employed in the emulsions used in this invention have a high degree of polymerization; and, therefore, have a high bonding strength, high tensile strength, good flexibility and a high softening point. The heat sealing temperature of the preferred polyvinyl acetate resin is in the range of 110–115° C. The aqueous emulsions of the preferred polyvinyl acetate resin may contain from 40 to 60% by weight of solids but, preferably, from 55 to 60% by weight of solids. The emulsion has a viscosity of 8–10 poises at 25° C., a pH in the range of 4 to 6 and contains less than 1.0% by weight of monomeric vinyl acetate. These resin emulsions are milky-white and the resin content thereof is tough, highly transparent; and, as well, possesses good light stability and excellent aging characteristics. The melting range of the polyvinyl acetate resin is between 100 and 250° C.

The base of the pointing compounds comprising this invention contains, in addition to an aqueous emulsion of a polyvinyl resin, either a plasticizing and extending resin or a plasticizer, though a mixture thereof may be employed very effectively. The plasticizing and extending resin employed may be a modified polystyrene resin. Polystyrene resin modified as described below is particularly suitable. The polystyrene resins which also have been found particularly suitable for use in this invention are the polymers obtained from mixtures of styrene and styrene homologues obtained from the fractionation of the crude solvent from light oils scrubbed out of coke oven or gas house gas, which fractions boil in the range of about 220° to 350° C. Such resins are described in Frank W. Corkery Patents 2,449,928 and 2,440,929. The resinous plasticizer and extender which it is preferred to employ in this invention consists of a combination of a major proportion of either polystyrene or of one of the foregoing polymeric mixtures of styrene and styrene homologues and a minor proportion of an alkyl ester of either an aryl acid, such as, for example, dibutyl phthalate, or an alicyclic acid; such as, for example, hydrogenated methyl abietate. The alkyl ester is used to provide flexible resin compositions that are tacky solids at room temperature and have low melting points, for example, about 50° C. (ball and ring method). These compositions are readily emulsified and have good pigment wetting properties. It is preferred to employ the foregoing blends of the polystyrene resin and the alkyl ester of an aryl or alicyclic acid without other plasticizers in preparing the base of the pointing compositions comprising this invention. The plasticizers which are employed in the base for the pointing compounds, preferably in lieu of the above blend, may be chlorinated diphenyls or alkyl esters of aryl acids; such as, for example, dibutyl phthalate, di-Caribtol phthalate, di-Cellosolve phthalate, diamyl phthalate, dibutoxyglycol phthalate, dimethoxyglycol phthalate, butyl phthalyl butyl glycolate, and methyl phthalyl ethyl glycolate. It is aso feasible to employ mixtures of the foregoing plasticizers and these plasticizers or mixtures thereof may be employed alone or with the foregoing plasticizing and extending resins. The amount of the plasticizing and extending resin employed is from 5 to 95%; and preferably from 35 to 65%, by weight, based upon the dry weight of resin in the aqueous emulsion of polyvinyl resin. The amount of plasticizer, per se, employed in the base of the pointing compound ranges between 5 and 30% by weight based on the dry weight of the resin in the aqueous emulsion of polyvinyl resin. The plasticizing and extending resin and the plasticizer may be employed separately or in admixture in conjunction with sufficient organic solvent to render these additives fluid. Butyl Carbitol and isophorone are typical of the solvents which may be employed. The organic solvents serve to increase the compatibility of the extender resin in the emulsion and improve the stability of the dispersion system. In addition, the organic solvents serve to decrease or adjust the rate of evaporation of the water from the pointing compositions when they are used and thereby retard the formation of a skin on the surface of the compositions after application. By virtue thereof, the evaporation of the liquid content of the pointing compositions may continue at a more uniform rate and the compositions set-up homogeneously.

The inorganic pigment employed with the base for the pointing compounds comprising this invention are characterized by good water absorbing properties in the absence of organic solvents. Inorganic pigments which have been found suitable for use in the pointing compound base are iron oxide (hematite-$Fe_2O_3$), iron oxide (magnetite-$Fe_3O_4$), chromic oxide ($Cr_2O_3$), ultramarine blue (sodium aluminum silicate-sodium sulfide-$Na_3Al_3Si_3S_2O_{12}$), and cadmium red lithopone which is a mixture of cadmium red (Cd 60%, S 25%, Se 15%) and barium sulfate. The inorganic pigment or the mixture thereof with an inorganic water absorbent filler is not incorporated with the base composition until all other components of the latter have been thoroughly blended. Thus, before the water absorbent material is added to the base composition, the plasticizing and extending resin or the plasticizers have been incorporated in the aqueous emulsion of the polyvinyl resin and these additions have become an integral part of the dispersed or discontinuous phase of the emulsion. When the base composition is in the condition described the water absorbent material including the inorganic pigment is added thereto, and, when thus incorporated, the water absorbent material absorbs a major proportion of the water which constitutes the dispersing or continuous phase of the aqueous emulsion. The incorporation of the inorganic pigment or the mixture thereof with a filler under the foregoing conditions is an important feature of this invention and the amount of inorganic pigment employed is critical in producing a stable homogeneous pointing compound of the proper fluid, paste-like consistency. The amount of inorganic pigment used ranges between about 50 and about 200 parts by weight to about 800 parts by weight of the aqueous emulsion of a polyvinyl resin. The relative amounts of inorganic pigment, plasticizing and extending resin and resin in the aqueous emulsion vary the consistency of the pointing compounds obtained by this invention. Thus, in a composition containing about 240 parts by weight of a plasticizer and extender resin from about 80 to 180 parts by weight of an inorganic pigment may be used depending upon the water absorbing capacity of the pigment. If about 120 parts by weight of the plasticizer and extender resin are employed larger amounts of inorganic pigment, up to about 200 parts by weight, must be employed to obtain the same consistency in the product. The same larger amounts of inorganic pigment must also be employed to obtain compositions having the desired consistency when an aqueous emulsion of a polyvinyl acetate resin containing about 40% by weight of the polyvinyl acetate resin is employed.

The water absorbent inorganic pigments employed in preparing the pointing compounds of this invention may be partially replaced with water absorbent inorganic extenders or fillers; such as, for example, finely ground silica or whiting. These extenders or fillers perform the same function in the dispersion system performed by the inorganic pigment; and, when combined with the latter, the extender or filler may be employed to vary the shade of or dilute the color produced by the pigment. The water absorbent inorganic extenders or fillers may be employed to replace up to 90% of any one of the foregoing water absorbent inorganic pigments.

The method of preparing the pointing compounds of this invention is important in obtaining a product having the properties and advantages previously described herein. In preparing these pointing compounds it is essential to form a base composition wherein the aqueous phase is free from organic solvents. This is accomplished by starting with a high solids content aqueous emulsion of a film-forming, high viscosity polyvinyl resin. The resinous plasticizer and extender or the plasticizer, which are preferably dissolved in sufficient organic solvent to render these substances fluid, are added slowly to the aqueous emulsion of the polyvinyl resin with vigorous stirring. When the addition is completed the mixture is agitated for about one hour and then is allowed to stand for a short while. In this manner the resinous plasticizer and extender and the plasticizer as well as any organic solvent therefor, are introduced into the dispersed polyvinyl resin in the aqueous emulsion thereof. If resin stabilizers or emulsifying agents are employed they must likewise be added, as described, to the aqueous emulsion of the polyvinyl resin before the incorporation of the pigment therein. When the base composition has been prepared in the foregoing manner, the inorganic pigment or the mixture thereof with a filler is slowly added to the base composition which is stirred as the pigment is added thereto. The inorganic pigment and the filler, if present, gradually and uniformly absorb a major proportion of the water forming the dispersing or continuous phase of the emulsion. If organic solvents were present in the aqueous phase the pigment would be wetted with such solvents and the ability of the pigment to absorb water would be diminished thereby. The foregoing process has several outstanding advantages. Thus, this process provides for the formation of a pigmented pointing compound without the need for milling the pigment and resinous binders which is so often required in the art of combining pigments and resins. This process affords very careful control of the consistency of the final product. If any variation of the water absorbing properties of an inorganic pigment occurs between different batches of the pigment, this may be compensated for by either increasing or decreasing the amount of pigment being added while observing the consistency as the pigment is added and stirred into the base composition. The addition of the inorganic pigment and fillers, if used in the manner described, has the advantage of preserving the emulsion. Thus, the water in excess of the amount required to provide an emulsified pigmented product in a creamy, paste-like consistency is gradually and uniformly absorbed by the inorganic pigment and the resin emulsion is not, therefore, broken by the addition of the pigment thereto. The pigmented pointing compounds thus produced consist of homogeneous dispersions of pigment and resin binders in water which do not separate even when packaged in collapsible tubes and kept in storage for long periods of time. The consistency of the pointing compounds of this invention are such that they may be dispensed from collapsible tube containers with ease and deposited in the spaces between sheets, panels, or tiles of glass, ceramic, plastic or enameled metal. The water content of the pigmented pointing composition is uniformly distributed throughout the pigment therein and the balance of the composition. The water, therefore, evaporates more uniformly from the body of the pointing compound to provide a uniformly colored elastic mass between adjacent edges of the glass or like members. The aqueous phase and the pigments of the pointing compounds are entirely free from any substance, such as, for example, organic solvents which might cause the color of the compound to run and produce streaks or blotches. If the pigmented pointing compounds are not formulated by the method described above the product will either separate to form a watery liquid and a dry, spongy or gummy mass or, during storage, the compound will become so stiff that it is impossible to dispense it from the collapsible tube container therefor.

The following examples are representative of the pigmented pointing compounds comprising this invention and of the method for preparing such compounds:

*Example 1*

360 parts by weight of a solution of 2 parts by weight of a modified polystyrene resin in 1 part by weight of a mixture of equal amounts by weight of butyl Carbitol and isophorone are added while stirring to 780 parts by weight of an aqueous emulsion containing about 55% by weight high viscosity polyvinyl acetate resin (Du Pont Elvacet 81–900). The modified polystyrene resin is a flexible resin containing polystyrene as the major constituent and containing a minor proportion of an alkyl ester of an alicyclic acid, namely, hydrogenated methyl abietate. Such modified resinous compositions which are sold under the trade name "Piccolastic C-50" are flexible, tacky solids at room temperature having a melting point of about 50° C. (ball and ring method). They also have good pigment wetting properties and are easily emulsified. After the resin solution is added to the aqueous emulsion the mixture is allowed to stand for awhile, thus providing an aqueous emulsion in which the dispersed phase contains a high viscosity polyvinyl acetate resin, and the solution of the modified polystyrene resin. To the base composition thus prepared 180 parts by weight of iron oxide (hematite $Fe_2O_3$) are slowly added with gentle mixing. A creamy paste-like red pointing compound is thus produced which may be packaged in collapsible metal tubes and kept in storage for a long period of time without having the compound separate or change in consistency.

In the above example a portion or all of the modified polystyrene resin may be replaced with chlorinated diphenyls or an alkyl ester of phthalic acid. For complete replacement chlorinated diphenyls or phthalates may be employed in amounts ranging between 5 and 30 by weight based on the dry weight of the polyvinyl acetate resin in the aqueous emulsion thereof. Similarly, satisfactory compositions are prepared by using modified polystyrene resin in which the major constituent is the polymer from mixture of styrene and styrene homologues obtained from light oils scrubbed out of coke oven gas as described above.

*Example 2*

A homogeneous pointing composition having the same consistency and stability as that described in Example 1, above, was prepared from 180 parts by weight of a solution of 2 parts by weight of the mixture of the modified polystyrene resin used in Example 1 in 1 part by weight of a mixture of equal parts by weight of butyl Carbitol and isophorone, 780 parts by weight of the aqueous emulsion of polyvinyl acetate containing about 55% by weight resin and 200 parts by weight of iron oxide (hematite). These components, in the amounts specified, were combined in the manner described in Example 1, above.

*Example 3*

360 parts by weight of a solution of 2 parts by weight of a modified polystyrene in 1 part by weight of equal amounts of butyl Carbitol and isophorone are added with stirring to 780 parts by weight of an aqueous emulsion containing about 55% by weight of a high viscosity polyvinyl acetate resin (Du Pont Elvacet 81–900). The modified polystyrene resin is the flexible resin having a melting point of about 50° C. described in Example 1 above. To this base composition in which the solution of modified polystyrene has become a part of the dispersed phase there is added about 84 parts by weight of iron oxide (magnetite $Fe_3O_4$). The pigment is added slowly with gentle mixing to absorb a major portion of the water constituting the dispersing or continuous phase of the emulsion. A deep black pointing compound is thus obtained which has a creamy, paste-like consistency and in which the pigment remains homogeneously dispersed for long periods of time. This product may be stored in collapsible metal tubes without separation of the components occurring and without any change in the original consistency.

*Example 4*

The base composition described in Examples 1 and 3 was prepared by the same method employing the same ingredients in the amounts specified in the foregoing examples. When an aqueous emulsion in which the aqueous phase thereof was substantially free of organic solvents was obtained, 180 parts by weight of chromic oxide ($Cr_2O_3$) were added slowly with gentle mixing to the base composition. A major proportion of the aqueous phase of the emulsion was absorbed by the pigment to produce a green pointing compound having a creamy, paste-like consistency. This compound was a stable homogeneous dispersion of pigment and resins which could be stored for long periods of time without deterioration.

*Example 5*

The process described in Example 4, above, was repeated substituting, however, 84 parts by weight of ultramarine blue for the chromic oxide pigment. A stable, homogeneous blue pointing compound having a creamy, paste-like consistency was produced.

*Example 6*

The process described in Example 4, above, was repeated substituting, however, 180 parts by weight of cadmium red lithopone for the chromic oxide pigment. A stable, homogeneous red pointing compound having a creamy, paste-like consistency was produced.

The compositions described in the foregoing examples each have a consistency which is most desirable for pointing the edges of the tile when they are being mounted. After the tile has been mounted it is often desired to apply a pointing composition between the edges of the mounted tile and this operation is termed face-pointing. The pointing compositions employed in face-pointing have, preferably, a lower viscosity than that of the products produced in accordance with Examples 1 to 6, inclusive. In order to obtain pointing compounds which are both homogeneous and stable but which have a viscosity suitable for face-pointing, it is necessary only to reduce the amount of water absorbent inorganic pigment or filler. Thus, the method described in Example 1, above, may be varied by reducing the amount of iron oxide (hematite) to 50 parts by weight to produce a pointing composition having the desired viscosity for face-pointing.

It will be apparent from the foregoing that this invention provides a means for obtaining pigmented pointing compounds which are stable during storage and retain the consistency originally imparted thereto during the formation of the compounds. The pigment is introduced into a base composition consisting of a disperse phase comprising polyvinyl resins and modifiers therefor and an aqueous phase which is substantially free from organic solvents. The inorganic pigment, by virtue of its water absorbing properties gradually and uniformly absorbs water from the continuous phase of the aqueous emulsion and controls the consistency of the final product without breaking the emulsion. The consistency imparted to the pointing compound during the formation thereof is retained during storage and until the compound is dispensed from its container in use. The pointing compounds set to form a permanently elastic material by loss of the fluid content of both phases of the emulsion, and this loss of fluid by evaporation is promoted by the presence of small quantities of the organic solvents which prevent the formation of a skin upon the surface of the pointing compounds after they are applied. The pointing compound, when used for its intended purpose, contains an inorganic pigment bonded by a tough, stable, age-resistant elastic resinous matrix. The pointing compound is free from substances which tend to cause the color to run, thus producing streaks, blotches and similar defects. A permanently attractive appearance is obtained in the instalaltion of sheets, panels or tiles of glass, ceramic and other materials. The pointing compounds firmly adhere to such materials, provide a cushioning effect due to their elastic nature and also provide an excellent barrier against water and moisture vapor.

I claim:

1. A stable homogeneous paste pointing composition which, when dry, is an elastic, moisture-resistant and color-fast sealing material providing a cushioning and sealing strip between glass sheets, said compound consisting of about 360 parts by weight of a solution of 2 parts by weight polystyrene containing a minor proportion of hydrogenated methyl abietate and 1 part by weight of equal amounts of isophorone and diethyleneglycol-n-butyl ether; about 780 parts by weight of an aqueous emulsion of polyvinyl acetate, said emulsion having a viscosity of from 8 to 10 poises at 25° C. and containing from 55 to 60 percent by weight of polyvinyl acetate solids; and from 50 to 200 parts by weight of an inorganic pigment selected from the group consisting of hematite, magnetite, chromic oxide, ultra-marine blue and cadmium red lithopone.

2. The pointing composition of claim 1 wherein said inorganic pigment consists of 180 parts by weight of hematite.

3. The pointing composition of claim 1 wherein said inorganic pigment consists of 84 parts by weight of magnetite.

4. The pointing composition of claim 1 wherein said inorganic pigment consists of 180 parts by weight of chromic oxide.

5. The pointing composition of claim 1 wherein said inorganic pigment consists of 84 parts by weight of ultra-marine blue.

6. The pointing composition of claim 1 wherein said inorganic pigment consists of 184 parts by weight of cadmium red lithopone.

References Cited in the file of this patent

UNITED STATES PATENTS

| | | |
|---|---|---|
| 2,125,527 | Tyce et al. | Aug. 2, 1938 |
| 2,435,909 | Tompkins | Feb. 10, 1948 |
| 2,536,470 | Schoenholz et al. | Jan. 2, 1951 |
| 2,595,952 | Kunze et al. | May 6, 1952 |